US008609751B2

(12) United States Patent
White et al.

(10) Patent No.: US 8,609,751 B2
(45) Date of Patent: Dec. 17, 2013

(54) POLYMER MICROFILLER COMPOSITES

(75) Inventors: Jerry E. White, Lake Jackson, TX (US); Hari Parvatareddy, Midland, MI (US); Felix Achille, Royal Palm Beach, FL (US); Leonardo C. Lopez, Midland, MI (US); Rudolf J. Koopmans, Einsiedeln (CH); Rene Broos, Bornem (BE); Steven R. Lakso, Sanford, MI (US)

(73) Assignee: Dow Global Technologies LLC, Midland, MI (US)

( * ) Notice: Subject to any disclaimer, the term of this patent is extended or adjusted under 35 U.S.C. 154(b) by 422 days.

(21) Appl. No.: 12/623,316

(22) Filed: Nov. 20, 2009

(65) Prior Publication Data

US 2010/0137478 A1    Jun. 3, 2010

Related U.S. Application Data

(60) Provisional application No. 61/117,808, filed on Nov. 25, 2008.

(51) Int. Cl.
*C08L 1/00* (2006.01)
*C08G 18/60* (2006.01)
*B32B 27/06* (2006.01)

(52) U.S. Cl.
USPC ........... 524/35; 528/339; 528/354; 428/423.1

(58) Field of Classification Search
USPC .............................. 524/35, 401; 528/339, 354
See application file for complete search history.

(56) References Cited

U.S. PATENT DOCUMENTS

| | | | | |
|---|---|---|---|---|
| 5,827,905 A * | 10/1998 | Grigat et al. | .................. | 523/124 |
| 6,034,163 A | 3/2000 | Barbee et al. | | |
| 6,172,167 B1 * | 1/2001 | Stapert et al. | .................. | 525/420 |
| 6,930,155 B2 * | 8/2005 | Weiss et al. | .................... | 525/424 |
| 2008/0214743 A1 | 9/2008 | Broos et al. | | |
| 2010/0041292 A1 | 2/2010 | Kim et al. | | |
| 2010/0041857 A1 | 2/2010 | Harris et al. | | |
| 2010/0126341 A1 | 5/2010 | Matteucci et al. | | |
| 2010/0126342 A1 | 5/2010 | Lopez et al. | | |
| 2010/0127434 A1 | 5/2010 | Broos et al. | | |
| 2010/0129591 A1 | 5/2010 | Lopez et al. | | |
| 2010/0129634 A1 | 5/2010 | Lopez et al. | | |
| 2010/0129641 A1 | 5/2010 | Lopez et al. | | |
| 2010/0222442 A1 * | 9/2010 | Prissok et al. | ................... | 521/60 |

FOREIGN PATENT DOCUMENTS

| | | |
|---|---|---|
| EP | 0376323 | 7/1990 |
| EP | 1253164 | 10/2002 |
| WO | 0042105 | 7/2000 |
| WO | 0216468 | 2/2002 |
| WO | 03070806 | 8/2003 |
| WO | 2007030791 | 3/2007 |
| WO | 2009134824 | 9/2007 |
| WO | 2008101051 | 8/2008 |
| WO | 2007099397 | 9/2008 |
| WO | 2008112833 | 11/2009 |

OTHER PUBLICATIONS

Ciferri, Alberto, "Supramolecular Polymers", Second Edition, 2005, pp. 157-158, CRC Press.
Corbin et al., "Chapter 6 Hydrogen-Bonded Supramolecular Polymers: Linear and Network Polymers and Self Assembling Discotic Polymers", Supramolecular Polymers, 2nd edition, CRC Press, 2005, pp. 153-182.
Ferre et al., "Poly(ester amide)s derived from 1,4-butanediol, adipic acid and 6-aminohexanoic acid. Part II: composition changes and fillers", Polymer, 2003, vol. 44, pp. 6139-6152, Elsevier Ltd.
Haltia et al. "Self-reinforcement and hydrolytic degradation of amorphous lactic acid based poly(ester-amide), and of its composite with sol-gel derived fibers", Journal of Materials Science: Materials in Medicine, 2002, vol. 13 No. 10, pp. 903-909, Kluwer Academic Publishers.
Koevoets et al., "Molecular Recognition in a Thermoplastic Elastomer", Journal of the American Chemical Society, 2005, pp. 2999-3003, vol. 127.
Krook et al., "Barrier and Mechanical Properties of Injection Molded Montmorillonite/Polyesteramide Nanocomposites", Polymer Engineering and Science, 2005, pp. 135-141, vol. 45(1), Wiley InterScience.
Lips et al., "Incorporation of different crystallizable amide blocks in segmented poly(ester amide)s", Polymer, 2005, pp. 7834-7842, vol. 46, Elsevier Ltd.
Lips et al., "Synthesis and characterization of poly(ester amide)s containing crystallizable amide segments", Polymer, 2005, pp. 7823-7833, vol. 46, Elsevier Ltd.
Liu et al., "The preparation and properties of biodegradable polyesteramide composites reinforced with nano-CaCO3 and nano-SiO2", Materials Letters, 2007, vol. 61, pp. 4216-4221, Elsevier B.V.
Martin et al., "Comprehensive Experimental Study of a Starch/Polyesteramide Coextrusion", Journal of Applied Polymer Science, 2002, vol. 86, pp. 2586-2600, Wiley Periodicals, Inc.
Willett et al., "Tensile yield properties of starch-filled poly(ester amide) materials", Polymer, 2005, vol. 46, pp. 3035-3042, Elsevier Ltd.
Zou et al., "Stabilization and mechanical properties of biodegradable aliphatic polyesteramide and its filled composites", Polymer Degradation and Stability, 2004, vol. 83, pp. 87-92, Elsevier Ltd.

* cited by examiner

*Primary Examiner* — Tae H Yoon

(57) ABSTRACT

The instant invention generally provides polymer microfiller composite comprising a molecularly self-assembling material and a microfiller, and a process of making and an article comprising the polymer microfiller composite.

10 Claims, 10 Drawing Sheets

POLYMER MICROFILLER COMPOSITES

CROSS-REFERENCE TO RELATED APPLICATION(S)

This application claims benefit of priority from U.S. Provisional Patent Application No. 61/117,808, filed Nov. 25, 2008, which application is incorporated by reference herein in its entirety.

The present invention is in the field of polymer microfiller composites.

BACKGROUND OF THE INVENTION

There is a need in the polymer art for new polymer microfiller composites, and processes of making and articles comprising the polymer microfiller composites.

SUMMARY OF THE INVENTION

In a first embodiment, the instant invention is a polymer microfiller composite comprising a molecularly self-assembling (MSA) material and a microfiller dispersed in the MSA material, wherein the microfiller is in the form of a particle having an average size of 1.0 micrometer (μm) or larger or a fiber having an average diameter of 1.0 micrometer or larger, and the microfiller comprises a cellulosic material or metal hydroxide, the microfiller comprising from 1 weight percent (wt %) to 90 wt % of the polymer microfiller composite based on total weight of the polymer microfiller composite. Preferably, the microfiller comprises the cellulosic material, more preferably a natural cellulosic material, still more preferably a natural cellulosic material comprising a wood or industrial hemp, and even more preferably the wood. In other embodiments, the microfiller comprises the metal hydroxide.

In a second embodiment, the instant invention is a process for making the polymer microfiller composite of the first embodiment, the process comprising the step of: mixing (e.g., dispersing) a desired amount of the microfiller in either a melt comprising the MSA material or a solution comprising a solvent and the MSA material to produce the polymer microfiller composite of the first embodiment. Preferably the process employs the melt comprising the MSA material.

In a third embodiment, the instant invention is an article comprising the polymer microfiller composite of the first embodiment. Preferably, the article comprises a molded part, construction material (e.g., a decking material such as a floor board or rail), paper (packaging and converting), tape, label, or automotive component (e.g., internal door panels). In other embodiments, the article comprises a cosmetic, sound insulation, barrier material, home furnishing, floor covering backing, coating substrate, laminating substrate, or electronic component. Preferably, the polymer microfiller composite of the first embodiment is extruded, molded, blow molded, or cast to form the article.

The polymer microfiller composite of the first embodiment is melt processable even at high filler concentrations (e.g., greater than or equal to 50 wt % filler).

Additional embodiments of the present invention are illustrated in the accompanying drawings and are described in the following detailed description and claims.

DETAILED DESCRIPTION OF THE INVENTION

Figure 1:
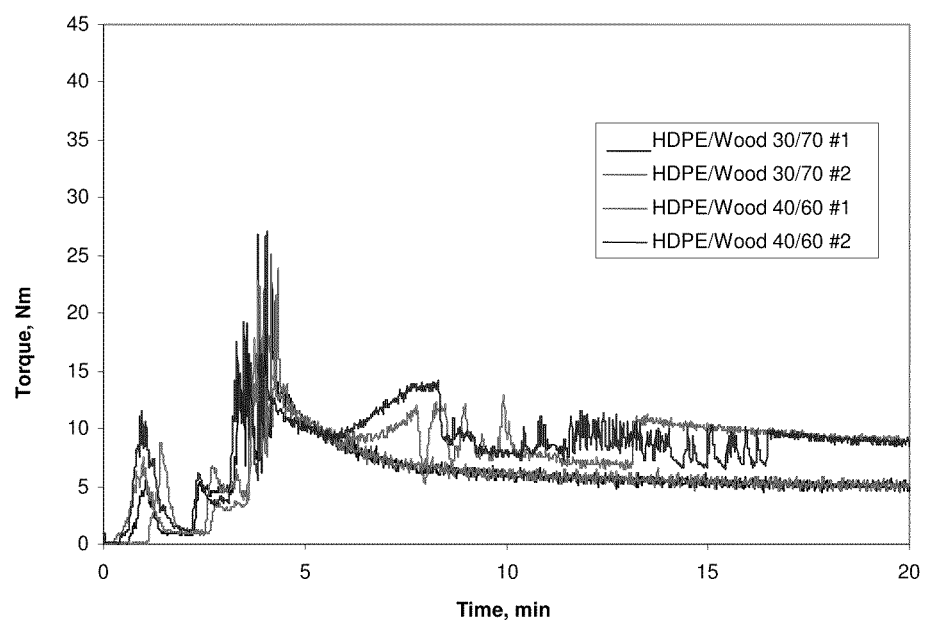
FIG. 1 is graphical plot of torque of blending for each of Blends 1 and 2 of Comparative Examples 1A and 1B.

As used herein, "a," "an," "the," "at least one," and "one or more" are used interchangeably. In any embodiment of the instant invention described herein, the open-ended terms "comprising," "comprises," and the like (which are synonymous with "including," "having," and "characterized by") may be replaced by the respective partially closed phrases "consisting essentially of," "consists essentially of," and the like or the respective closed phrases "consisting of," "consists of," and the like. In the present application, when referring to a preceding list of elements (e.g., ingredients), the phrases "mixture thereof," "combination thereof," and the like mean any two or more, including all, of the listed elements.

For purposes of U.S. patent practice and other patent practices allowing incorporation of subject matter by reference, the entire contents—unless otherwise indicated—of each U.S. patent, U.S. patent application, U.S. patent application publication, PCT international patent application and WO publication equivalent thereof, referenced in the instant Detailed Description of the Invention are hereby incorporated by reference. In an event where there is a conflict between what is written in the present specification and what is written in a patent, patent application, or patent application publication, or a portion thereof that is incorporated by reference, what is written in the present specification controls. The present specification may be subsequently amended to incorporate by reference subject matter from a U.S. patent or U.S. patent application publication, or portion thereof, instead of from a PCT international patent application or WO publication equivalent, or portion thereof, originally referenced herein, provided that no new matter is added and the U.S. patent or U.S. patent application publication claims priority directly from the PCT international patent application.

In the present application, headings (e.g., "Definitions") are used for convenience and are not meant, and should not be used, to limit scope of the present disclosure in any way.

In the present application, any lower limit of a range of numbers, or any preferred lower limit of the range, may be combined with any upper limit of the range, or any preferred upper limit of the range, to define a preferred embodiment of the range. Each range of numbers includes all numbers subsumed within that range (e.g., the range from about 1 to about 5 includes, for example, 1, 1.5, 2, 2.75, 3, 3.80, 4, and 5).

In an event where there is a conflict between a unit value that is recited without parentheses, e.g., 2 inches, and a corresponding unit value that is parenthetically recited, e.g., (5 centimeters), the unit value recited without parentheses controls.

DEFINITIONS

As used herein, the term "desired amount" means a weight sufficient for producing an intended composite.

The term "dispersed" means distributed substantially evenly throughout a medium (e.g., a polymer).

The term "fiber" means a fibril-, filament-, strand-, or thread-like structure. Preferably, the fiber has an aspect ratio of 10:1 or higher, preferably 100:1 or higher. In some embodiments, the fiber is continuous. In other embodiments, the fiber is discontinuous.

Preferably, the particle microfiller has an average size (i.e., particle size) in the range of from about 1.0 micrometer ($\mu m$) to about 1.0 millimeter (mm). More preferably, the average particle size is from about 2 $\mu m$ to about 10 $\mu m$. Particle size analysis methods and instruments are well known to the skilled person in the art. Preferably, particle size is determined using a Beckman Coulter RAPIDVUE™ instrument (Beckman Coulter Particle Characterization, Miami, Fla., USA). The particle size distribution is not critical and in some embodiments is characterized as being monodispersed, Gaussian, or random.

If necessary, average fiber diameter for a plurality of fibers can be determined by processing a scanning electron microscopy image thereof with, for example, a QWin image analysis system (Leica Microsystems GmbH, 35578 Wezlar, Germany).

The term "industrial hemp" means derived from a plant of the genus, *Cannabis*. Preferably, the plant is *Cannabis sativa* L. subspecies (subsp.) *sativa*, more preferably *Cannabis sativa* L. subsp. *sativa* variety (var.) *sativa*. Preferably, the industrial hemp is in a form of a fiber.

The term "metal hydroxide" means a formally charge-neutral particulate consisting of at least one hydroxide moiety (i.e., $HO^-$) and one or more cationic elements of any one of Groups 3 to 14 of the periodic table of the chemical elements.

Unless otherwise noted, the phrase "Periodic Table of the Elements" refers to the periodic table, version dated Jun. 22, 2007, published by the International Union of Pure and Applied Chemistry (IUPAC).

The term "$T_g$" means glass transition temperature as determined by differential scanning calorimetry (DSC).

The term "$T_m$" means melting temperature as determined by DSC. If a MSA material has one or more $T_m$, preferably at least one $T_m$ is 25° C. or higher.

For purposes herein, determine $T_g$ and $T_m$ according to the following procedure. Load a sample weighing between 5 milligrams (mg) and 10 mg into an aluminum hermetic DSC pan. Sequentially expose the sample to a first heating scan, holding step, cooling step, and a second heating scan. Particularly, in the first heating scan, heat the sample to 200° C. at a heating rate of 10° C. per minute. Hold the sample at 200° C. for 1 minute, and then cool the sample to −80° C. at a cooling rate of 10° C. per minute. Then in the second heating scan, heat the cooled sample to 200° C. at a heating rate of 10° C. per minute. Determine thermal events such as $T_g$ and $T_m$ from the second heating scan.

The term "viscosity" means zero shear viscosity unless specified otherwise.

Microfillers

When the microfiller comprises wood, preferably the wood is in the form of a fiber or a flour. Preferred wood fiber and flour comprises maple, oak, pine (e.g., Ponderosa Pine and Southern Yellow Pine), or spruce. In some embodiments, the wood is obtained from a commercial supplier such as, for example, American Wood Fibers, Columbia, Md., USA.

When the microfiller comprises a metal hydroxide, preferably the metal hydroxide comprises barium hydroxide, cobalt hydroxide, copper hydroxide, sodium hydroxide, lithium hydroxide, potassium hydroxide, magnesium hydroxide, or calcium hydroxide, and more preferably magnesium hydroxide or calcium hydroxide.

Preferably, the microfiller comprises a total of at least 20 wt %, more preferably at least 30 wt %, and still more preferably at least 40 wt % of the polymer microfiller composite of the first embodiment, based on total weight of the polymer microfiller composite. Also preferably, the microfiller comprises a total of about 80 wt % or less, more preferably about 70 wt % or less, and still more preferably about 60 wt % or less of the polymer microfiller composite of the first embodiment based on total weight of the polymer microfiller composite.

Molecularly Self-Assembling Material

As used herein a MSA material means an oligomer or polymer that effectively forms larger associated or assembled oligomers and/or polymers through the physical intermolecular associations of chemical functional groups. Without wishing to be bound by theory, it is believed that the intermolecular associations do not increase the molecular weight (Mn-Number Average molecular weight) or chain length of the self-assembling material and covalent bonds between said materials do not form. This combining or assembling occurs spontaneously upon a triggering event such as cooling to form the larger associated or assembled oligomer or polymer structures. Examples of other triggering events are the shear-induced crystallizing of, and contacting a nucleating agent to, a molecularly self-assembling material. Accordingly, in preferred embodiments MSAs exhibit mechanical properties similar to some higher molecular weight synthetic polymers and viscosities like very low molecular weight compounds. MSA organization (self-assembly) is caused by non-covalent bonding interactions, often directional, between molecular functional groups or moieties located on individual molecular (i.e. oligomer or polymer) repeat units (e.g. hydrogen-bonded arrays). Non-covalent bonding interactions include: electrostatic interactions (ion-ion, ion-dipole or dipole-dipole), coordinative metal-ligand bonding, hydrogen bonding, $\pi$-$\pi$-structure stacking interactions, donor-acceptor, and/or van der Waals forces and can occur intra- and intermolecularly to impart structural order. One preferred mode of self-assembly is hydrogen-bonding and this non-covalent bonding interactions is defined by a mathematical "Association constant", K(assoc) constant describing the relative energetic interaction strength of a chemical complex or group of complexes having multiple hydrogen bonds. Such complexes give rise to the higher-ordered structures in a mass of MSA materials. A description of self assembling multiple H-bonding arrays can be found in "Supramolecular Polymers", Alberto Ciferri Ed., 2nd Edition, pages (pp) 157-158. A "hydrogen bonding array" is a purposely synthesized set (or group) of chemical moieties (e.g. carbonyl, amine, amide, hydroxyl. etc.) covalently bonded on repeating structures or units to prepare a self assembling molecule so that the individual chemical moieties preferably form self assembling donor-acceptor pairs with other donors and acceptors on the same, or different, molecule. A "hydrogen bonded complex" is a chemical complex formed between hydrogen bonding arrays. Hydrogen bonded arrays can have association constants K (assoc) between $10^2$ and $10^9$ $M^{-1}$ (reciprocal molarities), generally greater than $10^3$ $M^{-1}$. In preferred embodiments, the arrays are chemically the same or different and form complexes.

Accordingly, the molecularly self-assembling materials (MSA) presently include: molecularly self-assembling polyesteramides, copolyesteramide, copolyetheramide, copolyetherester-amide, copolyetherester-urethane, copolyether-urethane, copolyester-urethane, copolyester-urea, copolyetherester-urea and their mixtures. Preferred MSA include copolyesteramide, copolyether-amide, copolyester-urethane, and copolyether-urethanes. The MSA preferably has number average molecular weights, $MW_n$ (interchangeably referred to as $M_n$) (as is preferably determined by NMR spectroscopy) of 2000 grams per mole or more, more preferably at least about 3000 g/mol, and even more preferably at least about 5000 g/mol. The MSA preferably has $MW_n$ 50,000 g/mol or less, more preferably about 20,000 g/mol or less, yet more preferably about 15,000 g/mol or less, and even more preferably about 12,000 g/mol or less. The MSA material preferably comprises molecularly self-assembling repeat units, more preferably comprising (multiple) hydrogen bonding arrays, wherein the arrays have an association constant K (assoc) preferably from $10^2$ to $10^9$ reciprocal molarity ($M^{-1}$) and still more preferably greater than $10^3$ $M^{-1}$; association of multiple-hydrogen-bonding arrays comprising donor-acceptor hydrogen bonding moieties is the preferred mode of self assembly. The multiple H-bonding arrays preferably comprise an average of 2 to 8, more preferably 4-6, and still more preferably at least 4 donor-acceptor hydrogen bonding moieties per molecularly self-assembling unit. Molecularly self-assembling units in preferred MSA materials include bis-amide groups, and bis-urethane group repeat units and their higher oligomers.

Preferred self-assembling units in the MSA material useful in the present invention are bis-amides, bis-urethanes and bis-urea units or their higher oligomers. A more preferred self-assembling unit comprises a poly(ester-amide), poly(ether-amide), poly(ester-urea), poly(ether-urea), poly(ester-urethane), or poly(ether-urethane), or a mixture thereof. For convenience and unless stated otherwise, oligomers or polymers comprising the MSA materials may simply be referred to herein as polymers, which includes homopolymers and interpolymers such as co-polymers, terpolymers, etc.

In some embodiments, the MSA materials include "non-aromatic hydrocarbylene groups" and this term means specifically herein hydrocarbylene groups (a divalent radical formed by removing two hydrogen atoms from a hydrocarbon) not having or including any aromatic structures such as aromatic rings (e.g. phenyl) in the backbone of the oligomer or polymer repeating units. In some embodiments, non-aromatic hydrocarbylene groups are optionally substituted with various substituents, or functional groups, including but not limited to: halides, alkoxy groups, hydroxy groups, thiol groups, ester groups, ketone groups, carboxylic acid groups, amines, and amides. A "non-aromatic heterohydrocarbylene" is a hydrocarbylene that includes at least one non-carbon atom (e.g. N, O, S, P or other heteroatom) in the backbone of the polymer or oligomer chain, and that does not have or include aromatic structures (e.g., aromatic rings) in the backbone of the polymer or oligomer chain. In some embodiments, non-aromatic heterohydrocarbylene groups are optionally substituted with various substituents, or functional groups, including but not limited to: halides, alkoxy groups, hydroxy groups, thiol groups, ester groups, ketone groups, carboxylic acid groups, amines, and amides. Heteroalkylene is an alkylene group having at least one non-carbon atom (e.g. N, O, S or other heteroatom) that, in some embodiments, is optionally substituted with various substituents, or functional groups, including but not limited to: halides, alkoxy groups, hydroxy groups, thiol groups, ester groups, ketone groups, carboxylic acid groups, amines, and amides. For the purpose of this disclosure, a "cycloalkyl" group is a saturated carbocyclic radical having three to twelve carbon atoms, preferably three to seven. A "cycloalkylene" group is an unsaturated carbocyclic radical having three to twelve carbon atoms, preferably three to seven. Cycloalkyl and cycloalkylene groups independently are monocyclic or polycyclic fused systems as long as no aromatics are included. Examples of carbocyclic radicals include cyclopropyl, cyclobutyl, cyclopentyl, cyclohexyl and cycloheptyl. In some embodiments, the groups herein are optionally substituted in one or more substitutable positions as would be known in the art. For example in some embodiments, cycloalkyl and cycloalkylene groups are optionally substituted with, among others, halides, alkoxy groups, hydroxy groups, thiol groups, ester groups, ketone groups, carboxylic acid groups, amines, and amides. In some embodiments, cycloalkyl and cycloalkene groups are optionally incorporated into combinations with other groups to form additional substituent groups, for example: "-Alkylene-cycloalkylene-", "-alkylene-cycloalkylene-alkylene-", "-heteroalkylene-cycloalkylene-", and "-heteroalkylene-cycloalkyl-heteroalkylene" which refer to various non-limiting combinations of alkyl, heteroalkyl, and cycloalkyl. These combinations include groups such as oxydialkylenes (e.g., diethylene glycol), groups derived from branched diols such as neopentyl glycol or derived from cyclo-hydrocarbylene diols such as Dow Chemical's UNOXOL® isomer mixture of 1,3- and 1,4-cyclohexanedimethanol, and other non-limiting groups, such -methylcylohexyl-, -methyl-cyclohexyl-methyl-, and the like. "Heterocycloalkyl" is one or more cyclic ring systems having 4 to 12 atoms and, containing carbon atoms and at least one and up to four heteroatoms selected from nitrogen, oxygen, or sulfur. Heterocycloalkyl includes fused ring structures. Preferred heterocyclic groups contain two ring nitrogen atoms, such as piperazinyl. In some embodiments, the heterocycloalkyl groups herein are optionally substituted in one or more substitutable positions. For example in some embodiments, heterocycloalkyl groups are optionally substituted with halides, alkoxy groups, hydroxy groups, thiol groups, ester groups, ketone groups, carboxylic acid groups, amines, and amides.

Examples of MSA materials useful in the present invention are poly(ester-amides), poly(ether-amides), poly(ester-ureas), poly(ether-ureas), poly(ester-urethanes), and poly(ether-urethanes), and mixtures thereof that are described, with preparations thereof, in (USPN) U.S. Pat. No. 6,172,167; and applicant's co-pending PCT application numbers PCT/US2006/023450, which was renumbered as PCT/US2006/004005 and published under PCT International Patent Application Number (PCT-IPAPN) WO 2007/099397 and U.S. Patent Application Publication Number (USPAPN) 2008-0214743; PCT/US2006/035201, which published under PCT-IPAPN WO 2007/030791; PCT/US08/053,917, which published under PCT-IPAPN WO 2008/101051; PCT/US08/056,754, which published under PCT-IPAPN WO 2008/112833; and PCT/US08/065,242. Preferred said MSA materials are described below.

In a set of preferred embodiments, the molecularly self-assembling material comprises ester repeat units of Formula I:

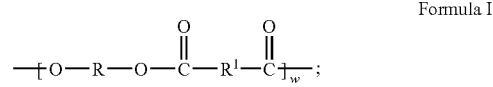

Formula I and at least one second repeat unit selected from the esteramide units of Formula II and III:

Formula II

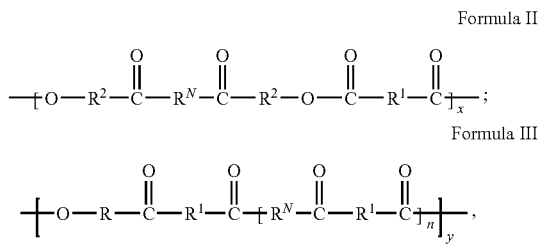

Formula III and the ester-urethane units of Formula IV:

Formula IV

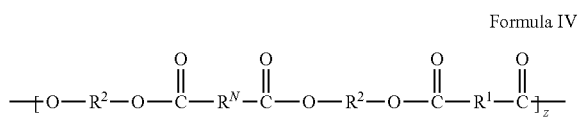

wherein

R is at each occurrence, independently a $C_2$-$C_{20}$ non-aromatic hydrocarbylene group, a $C_2$-$C_{20}$ non-aromatic heterohydrocarbylene group, or a polyalkylene oxide group having a group molecular weight of from about 100 to about 5000 g/mol. In preferred embodiments, the $C_2$-$C_{20}$ non-aromatic hydrocarbylene at each occurrence is independently specific groups: alkylene-, -cycloalkylene-, -alkylene-cycloalkylene-, -alkylene-cycloalkylene-alkylene-(including dimethylene cyclohexyl groups). Preferably, these aforementioned specific groups are from 2 to 12 carbon atoms, more preferably from 3 to 7 carbon atoms. The $C_2$-$C_{20}$ non-aromatic heterohydrocarbylene groups are at each occurrence, independently specifically groups, non-limiting examples including: -hetereoalkylene-, -heteroalkylene-cycloalkylene-, -cycloalkylene-heteroalkylene-, or -heteroalkylene-cycloalkylene-hetereoalkylene-, each aforementioned specific group preferably comprising from 2 to 12 carbon atoms, more preferably from 3 to 7 carbon atoms. Preferred heteroalkylene groups include oxydialkylenes, for example diethylene glycol ($-CH_2CH_2OCH_2CH_2-O-$). When R is a polyalkylene oxide group it preferably is a polytetramethylene ether, polypropylene oxide, polyethylene oxide, or their combinations in random or block configuration wherein the molecular weight (Mn-average molecular weight, or conventional molecular weight) is preferably about 250 g/ml to 5000, g/mol, more preferably more than 280 g/mol, and still more preferably more than 500 g/mol, and is preferably less than 3000 g/mol; in some embodiments, mixed length alkylene oxides are included. Other preferred embodiments include species where R is the same $C_2$-$C_6$ alkylene group at each occurrence, and most preferably it is $-(CH_2)_4-$.

$R^1$ is at each occurrence, independently, a bond, or a $C_1$-$C_{20}$ non-aromatic hydrocarbylene group. In some preferred embodiments, $R^1$ is the same $C_1$-$C_6$ alkylene group at each occurrence, most preferably $-(CH_2)_4-$.

$R^2$ is at each occurrence, independently, a $C_1$-$C_{20}$ non-aromatic hydrocarbylene group. According to another embodiment, $R^2$ is the same at each occurrence, preferably $C_1$-$C_6$ alkylene, and even more preferably $R^2$ is $-(CH_2)_2-$, $-(CH_2)_3-$, $-(CH_2)_4-$, or $-(CH_2)_5-$.

$R^N$ is at each occurrence $-N(R^3)-Ra-N(R^3)-$, where $R^3$ is independently H or a $C_1$-$C_6$ alkyl, preferably $C_1$-$C_4$ alkyl, or $R^N$ is a $C_2$-$C_{20}$ heterocycloalkylene group containing the two nitrogen atoms, wherein each nitrogen atom is bonded to a carbonyl group according to Formula II or III above; w represents the ester mol fraction, and x, y and z represent the amide or urethane mole fractions where w+x+y+z=1, 0<w<1, and at least one of x, y and z is greater than zero. Ra is a $C_2$-$C_{20}$ non-aromatic hydrocarbylene group, more preferably a $C_2$-$C_{12}$ alkylene: most preferred Ra groups are ethylene butylene, and hexylene $-(CH_2)_6-$. In some embodiments, $R^N$ is piperazin-1,4-diyl. According to another embodiment, both $R^3$ groups are hydrogen.

n is at least 1 and has a mean value less than 2.

In an alternative embodiment, the MSA is a polymer consisting of repeat units of either Formula II or Formula III, wherein R, $R^1$, $R^2$, $R^N$, and n are as defined above and x and y are mole fractions wherein x+y=1, and 0≤x≤1 and 0≤y≤1.

In certain embodiments comprising polyesteramides of Formula I and II, or Formula I, II, and III, particularly preferred materials are those wherein R is $-(C_2$-$C_6)-$ alkylene, especially $-(CH_2)_4-$. Also preferred are materials wherein $R^1$ at each occurrence is the same and is $C_1$-$C_6$ alkylene, especially $-(CH_2)_4-$. Further preferred are materials wherein $R^2$ at each occurrence is the same and is $-(C_1$-$C_6)-$ alkylene, especially $-(CH_2)_5-$ alkylene. The polyesteramide according to this embodiment preferably has a number average molecular weight (Mn) of at least about 4000, and no more than about 20,000. More preferably, the molecular weight is no more than about 12,000.

For convenience the chemical repeat units for various embodiments are shown independently. The invention encompasses all possible distributions of the w, x, y, and z units in the copolymers, including randomly distributed w, x, y and z units, altenatingly distributed w, x, y and z units, as well as partially, and block or segmented copolymers, the definition of these kinds of copolymers being used in the conventional manner as known in the art. Additionally, there are no particular limitations in the invention on the fraction of the various units, provided that the copolymer contains at least one w and at least one x, y, or z unit. In some embodiments, the mole fraction of w to (x+y+z) units is between about 0.1:0.9 and about 0.9:0.1. In some preferred embodiments, the copolymer comprises at least 15 mole percent w units, at least 25 mole percent w units, or at least 50 mole percent w units In some embodiments, the number average molecular weight ($M_n$) of the MSA material useful in the present invention is between 1000 g/mol and 30,000 g/mol, inclusive. In some embodiments, $M_n$ of the MSA material is between 2,000 g/mol and 20,000 g/mol, inclusive, preferably 5,000 g/mol to 12,000 g/mol. In more preferred embodiments, $M_n$ of the MSA material is less than 5,000 g/mol. Thus, in some more preferred embodiments, $M_n$ of the MSA material is at least about 1000 g/mol and 4,900 g/mol or less, more preferably 4,500 g/mol or less.

Viscosity of a melt of a preferred MSA material is characterized as being Newtonian over the frequency range of $10^{-1}$ to $10^2$ radians per second (rad./s.) at a temperature from above a melting temperature $T_m$ up to about 40 degrees Celsius (° C.) above $T_m$, preferably as determined by differential scanning calorimetry (DSC). Depending upon the polymer or oligomer, preferred MSA materials exhibit Newtonian viscosity in the test range frequency at temperatures above 100° C., more preferably above 120° C. and more preferably still at or above 140° C. and preferably less than 300° C., more preferably less than 250° C. and more preferably still less than 200° C. For the purposes of the present disclosure, the term Newtonian has its conventional meaning; that is, approximately a constant viscosity with increasing (or decreasing) shear rate of a (MSA) material at a constant testing temperature. The zero shear viscosity of a preferred MSA material is in the range of from 0.1 Pa·s. to 1000 Pa·s., preferably from 0.1 Pa·s. to 100 Pa·s., more preferably from 0.1 to 30 Pa·s., still more preferred 0.1 Pa·s. to 10 Pa·s., between the temperature range of 180° C. and 220° C., e.g., 180° C. and 190° C.

Preferably, the viscosity of a melt of a MSA material useful in the present invention is less than 100 Pa·s. at from above $T_m$ up to about 40° C. above $T_m$. The viscosity of one of the preferred MSA materials is less than 100 Pa·s. at 190° C., and more preferably in the range of from 1 Pa·s. to 50 Pa·s. at 150° C. to 180° C. Preferably, the glass transition temperature of the MSA material is less than 20° C. Preferably, the melting temperature is higher than 60° C. Preferred MSA materials exhibit multiple glass transition temperatures $T_g$. Preferably, the MSA material has a $T_g$ that is higher than −80° C. Also preferably, the MSA material has a $T_g$ that is higher than −60° C.

Tensile modulus of one preferred group of MSA materials is preferably from 4 megapascals (MPa) to 500 MPa at room temperature, preferably 20° C. Tensile modulus testing is well known in the polymer arts.

Preferably, torsional (dynamic) storage modulus of MSA materials useful in the invention is at least 100 MPa at 20° C. More preferably, the storage modulus is at least 200 MPa, still more preferably at least 300 MPa, and even more preferably greater than 400 MPa, all at 20° C.

Preferably, polydispersities of substantially linear MSA materials useful in the present invention is 4 or less, more preferably 3 or less, still more preferably 2.5 or less, still more preferably 2.2 or less.

In some embodiments, the polymers described herein are modified with, for example and without limitation thereto, other polymers, resins, tackifiers, fillers, oils and additives (e.g. flame retardants, antioxidants, pigments, dyes, and the like).

The Polymer Microfiller Composite

A preferred polymer microfiller composite of the first embodiment is characterized, when its MSA material is a melt, as having a zero shear viscosity of less than 10,000,000 Pa·s., more preferably 1,000,000 Pa·s. or less, still more preferably 1000 Pa·s. or less, and even more preferably 500 Pa·s. or less at from above $T_m$ up to about 40° C. above $T_m$ of the MSA material, preferably from 150° C. to 180° C.

In some embodiments, polymer microfiller composite consists essentially of a MSA material and a wood fiber (i.e., polymer wood fiber composite). Preferably, the polymer wood fiber composite is characterized as having a flexural modulus of from 350 kilo-pounds per square inch (ksi or kpsi or Kpsi) (2400 MPa) to 750 ksi (5200 MPa) at 70 wt % wood fiber (WF) content or, more preferably, from 300 kilo-pounds per square inch (ksi; 2100 megaPascals (MPa)) to 700 ksi (4800 MPa) at 60 wt % wood fiber content, as determined following the flexural modulus testing method of ASTM D-790. Alternatively, the polymer wood fiber composite is characterized as having a tensile stress at break of from 1.0 ksi (6.9 MPa) to 2.0 ksi (14 MPa) at 70 wt % wood fiber content or, more preferably, from 0.50 ksi (3.4 MPa) to 3.1 ksi (21 MPa) at 60 wt % wood fiber content, as determined following the ultimate tensile testing method of ASTM D-638. Alternatively, the polymer wood fiber composite is characterized as having a tensile strain at break of from 0.3 ksi (2.1 MPa) to 0.6 ksi (4.1 MPa) at 70 wt % wood fiber content or, more preferably, from 0.20 ksi (1.4 MPa) to 1.3 ksi (9.0 MPa) at 60 wt % wood fiber content, as determined following the ultimate tensile testing method of ASTM D-638. Combinations of two or more of the flexural modulus, tensile stress at break, and tensile strain at break embodiments are contemplated.

The Process of Making the Polymer Microfiller Composite

Preferably, temperature of the melt comprising the MSA material during the dispersing of microfiller therein is less than 250° C., more preferably less than 200° C., and still more preferably less than 180° C. In some embodiments where the microfiller is the cellulosic material, the temperature of the melt preferably is less than 180° C., a scorch temperature of wood.

In some embodiments, the melt of the polymer microfiller composite is characterized by having a torque of mixing of less than 30 Newton-meters (N·m), more preferably less than 20 N·m, and still more preferably less than 10 N·m. The torque of mixing is measured in the Haake blender under the conditions of blending described in the examples.

In some embodiments, the microfiller is dispersed in the melt comprising the MSA material at a rate of mixing of at least about 20 revolutions per minute (rpm), preferably at least about 30 rpm, more preferably at least about 50 rpm, still more preferably at least about 100 rpm, and even more preferably at least about 200 rpm.

The relatively low temperature of the melt comprising the MSA material during the dispersing (e.g., mixing) of microfiller therein, low torque of mixing, and high rate of mixing as compared to, for example, the temperature, torque and mixing rates of a comparator melt comprising a thermoplastic polyurethane and the microfiller, is preferred for MSA materials having the zero shear viscosities described previously (e.g., preferably in the range of from 1 Pa·s. to 50 Pa·s. at 150° C. to 170° C.).

Materials and Methods

Materials

A 40-mesh maple wood fiber is obtained from American Wood Fibers, referenced above.

High Density Polyethylene (HDPE) 12450N is obtained from The Dow Chemical Company.

AMPLIFY™ GR205 is a maleic anhydride (MAH) modified polyethylene and is obtained from The Dow Chemical Company.

Magnesium hydroxide ($Mg(OH)_2$) is Dead Sea S-10 grade.

Determining Copolymer Number Average Molecular Weight ($M_n$)

Proton nuclear magnetic resonance spectroscopy (proton NMR or $^1$H-NMR) is used to determine monomer purity, copolymer composition, and copolymer number average molecular weight $M_n$ utilizing the $CH_2OH$ end groups. Proton NMR assignments are dependent on the specific structure being analyzed as well as the solvent, concentration, and temperatures utilized for measurement. For ester amide monomers and co-polyesteramides, d4-acetic acid is a convenient solvent and is the solvent used unless otherwise noted. For ester amide monomers of the type called DD that are methyl esters typical peak assignments are about 3.6 to 3.7 ppm for C(=O)—$OCH_3$; about 3.2 to 3.3 ppm for N—$CH_2$—; about 2.2 to 2.4 ppm for C(=O)—$CH_2$—; and about 1.2 to 1.7 ppm for C—$CH_2$—C. For co-polyesteramides that are based on DD with 1,4-butanediol, typical peak assignments are about 4.1 to 4.2 ppm for C(=O)—$OCH_2$—; about 3.2 to 3.4 ppm for N—$CH_2$—; about 2.2 to 2.5 ppm for C(=O)—$CH_2$—; about 1.2 to 1.8 ppm for C—$CH_2$—C, and about 3.6 to 3.75 $CH_2OH$ end groups.

Calculating Weight Percents (Wt %) of Composites

Weight percents (wt %) of ingredients of the composites of the Comparative Examples and Examples of the Present Invention described below are based on total weight of the respective composites.

Compounding Procedures for Preparing Polymer Microfiller Composites

Prior to compounding, all MSA materials and filler materials are pre-weighed and stored separately. In the following procedure, the MSA materials and microfillers are not dried before blending.

Compounding Procedure 1: microfiller is a cellulosic material (e.g., wood fiber). A Haake PolyLab Rheocord blender (Haake) is outfitted with a 20 milliliter (mL) bowl. Temperatures of all zones of the Haake mixer are set to either 180° C., 170° C., or 130° C. An air cooling hose is attached to the central one of the zones in order to maintain temperature control. The MSA material is loaded into the 20 mL bowl and allowed to melt. Microfiller material is added directly to the MSA material melt. Then, a plunger is lowered into the Haake, and the melt of the MSA material and microfiller is compounded at a rotor speed of 200 revolutions per minute (rpm), and a residence time of approximately 2.5 minutes. The residence time begins with the lowering of the plunger, and ends with the raising the plunger. Table 1 presents the timing for the cellulosic material compounding.

TABLE 1

Summary of cellulosic material composite compounding procedure

| Time | rpm | Comment |
| --- | --- | --- |
| 0 second | 200 | |
| 10 seconds | 50 | Add MSA material |
| 1 minute 10 seconds | 200 | Allow MSA material to melt |
| 1 minute 30 seconds | 200 | Add cellulosic material |
| 2 minutes 30 seconds | 200 | Compound to give cellulosic material composite |
| 5 minutes | 0 | Recover cellulosic material composite |

Compounding Procedure 2: microfiller is $Mg(OH)_2$. The Haake is fitted with a 60 mL bowl and run at 170° C. and 50 rpm. The MSA material is added to the Haake bowl first and allowed to melt. Then the $Mg(OH)_2$ is added and blended into the MSA material for 10 minutes after all the $Mg(OH)_2$ is added. The resulting composites are removed from the Haake and pressed into flat pieces while still warm. After cooling at room temperature, the pressed composite material is cut into pieces for compression molding.

Compression Molding:

Prior to molding, all samples are allowed to dry overnight (at least 16 hours) at 65° C. in a vacuum of approximately 36 cmHg (48 kiloPascals (kPa)). Samples are compression molded into 10 cm×10 cm×0.05 cm plaques and 5 cm×1.25 cm×0.32 cm bars unless otherwise noted. Compression molding is done using a MPT-14 compression/lamination press (Tetrahedron Associates, Inc., San Diego, Calif., USA) having a molder and mold chase.

Compression Molding Procedure 1 (used for unfilled MSA material and most MSA material-wood composites):

| Procedure 1: | 170° C./4 minutes/1000 pounds per square inch (psi) (7000 kiloPascals (kPa)) |
| --- | --- |
| | 170° C./1 minutes/35000 psi (240,000 kPa) |
| | Cool/3:30 minutes/35000 psi (240,000 kPa) |
| Repack: | 170° C./5 minutes/1000 psi (7000 kPa) |
| | 170° C./2 minutes/40000 psi (300,000 kPa) |
| | 170° C./2 minutes/1000 psi (7000 kPa) |
| | 170° C./2 minutes/40000 psi (300,000 kPa) |
| | Cool/5 minutes/40000 psi (300,000 kPa) |

Compression Molding Procedure 2 (used for MSA material-wood composites when temperatures lower than 170° C. are desired):

| Procedure 2: | 130° C./4 minutes/1000 psi (7000 kPa) |
| --- | --- |
| | 130° C./1 minutes/35000 psi (240,000 kPa) |
| | Cool/3:30 minutes/35000 psi (240,000 kPa) |
| Repack: | 130° C./5 minutes/1000 psi (7000 kPa) |
| | 130° C./2 minutes/40000 psi (300,000 kPa) |
| | 130° C./2 minutes/1000 psi (7000 kPa) |
| | 130° C./2 minutes/40000 psi (300,000 kPa) |
| | Cool/5 minutes/40000 psi (300,000 kPa) |

Compression Molding Procedure 3 (used for composite of Example 5 of the Present Invention below):

Samples containing $Mg(OH)_2$ are compression molded into 5 cm by 5 cm by 0.3 cm plaques at 90° C. and 5000 psi. Cool composites under pressure in molder to room temperature or less to allow clean removal of the plaques from the mold chase.

Testing:

Ultimate Tensile: procedure of ASTM D-638
Flexural modulus: procedure of ASTM D-790

Imaging:

Light microscope imaging: Leica WILD M10 equipped with a Nikon DXM-1200 digital camera and ACT-1 imaging software. Fracture surfaces are mounted onto SEM stubs using carbon tape, copper tape, and carbon paint. The mounts are then imaged using oblique light microscopy with a stereo zoom optical microscope to document the fracture surfaces prior to metal coating for SEM. A fiber optic is used to illuminate the surface at some oblique angle to better visualize the fracture surface.

Scanning Electron Microscope (SEM) imaging: Fracture surfaces are mounted onto SEM stubs using carbon tape, copper tape, and carbon paint. The mounts are then imaged using oblique light microscopy with a stereo zoom optical microscope to document the fracture surfaces. The samples are then coated with about 80 A Cr followed by coating using Au/Pd. Secondary electron images were collected at about 10 millimeters (mm) working distance using 5 kilovolt (kV) accelerating voltage.

Transmission electron microscope (TEM) imaging: Samples, approximately 0.5 mm in thickness, from the compression molded plaques and mounted in a chuck for ultracryomicrotomy. Cross-sectional to the thickness, the samples are trimmed into a trapezoid and cooled to −100° C. in the microtome. Thin-sections, approximately 80 nm are obtained with a Leica UC6:FC6 cryo-microtome and examined in a JEOL 1230 operating at an accelerating voltage of 120 kilovolts (kV). Digital TEM images of the microstructure are recorded at various magnifications (typically 1,000 times; 10,000 times; and 50,000 times magnification) using a Gatan Multiscan CCD camera. Show magnified TEM images as black-and-white photographs.

Thermogravimetric Analysis (TGA) Procedure

Samples weighing between 5 milligrams (mg) and 10 mg are loaded into an aluminum TGA pan and heated to 500° C.

at a rate of 10° C./minute in a TA Instruments Q5000 TGA in a nitrogen gas atmosphere. TGA is used to determine actual concentration of inorganics in a composite. Plot results as weight percent (weight %) versus temperature (° C.), wherein weight percent means residual weight of a sample as a percent of original weight of the sample.

Dynamic Mechanical Spectroscopy (DMS) Procedure

Prior to conducting DMS experiments, all samples are exposed to laboratory atmosphere for at least 40 hours to allow for sample equilibration to the test environment. Samples are in the form of the 5 cm×1.25 cm×0.32 cm compression molded bars, which are loaded into torsional rectangular holders of an Ares Rheometer from TA Instruments. Initially, a dynamic strain sweep is conducted at 1 Hz and 25° C. beginning at a strain of 0.001%. For each sample a strain value is obtained from a region where storage modulus (G') is linear over a range of strain values. This strain value is used for subsequent dynamic frequency sweeps and dynamic temperature ramps. Using the strain value obtained during the strain sweep, a frequency sweep is conducted at 25° C. The frequency ranged from 100 radians per second (rad/s.) to 0.01 rad/s. Finally, a temperature ramp is conducted from −80° C. to 100° C. at a heating rate of 5° C./minute. The frequency is held constant at 1 Hz. Plot results as storage modulus, G', in Pascals (Pa) versus temperature (° C.).

Melt Viscosity Measurement Procedure

Samples are die cut from a plaque of composite. Parallel plate geometry holders in an Ares Rheometer (TA Instruments) are heated to 170° C. The holders are zeroed at temperature. A sample is loaded onto the holders, and the top holder is lowered into that sample so that there is significant normal force on the sample. The sample is allowed to melt, and any melted sample that extends beyond the holders is removed. Initially, a dynamic strain sweep is conducted at 1 Hz and 170° C. beginning at a strain of 0.1%. For each sample, a strain value is obtained from a region where dynamic loss shear modulus (G") is linear over a range of strain values. This strain value is used for subsequent dynamic frequency sweeps. Using the strain value obtained during the strain sweep, a frequency sweep is conducted at 170° C. The frequency ranged from 100 rad/s. to 0.1 rad/s. Plot results as viscosity in Pascal-seconds (Pa·s.) versus frequency in radians per second (rad/s.).

Preparations

Samples 1, 2, and 3

Preparation of MSA Material that is a Polyesteramide (PEA) Comprising 50 Mole Percent of Ethylene-N,N'-dihydroxyhexanamide (C2C) Monomer (the MSA Material is Generally Designated as a PEA-C2C50%)

Step (a) Preparation of the Diamide diol, ethylene-N,N'-dihydroxyhexanamide (C2C) Monomer The C2C diamide diol monomer is prepared by reacting 1.2 kg ethylene diamine (EDA) with 4.56 kilograms (kg) of ε-caprolactone under a nitrogen blanket in a stainless steel reactor equipped with an agitator and a cooling water jacket. An exothermic condensation reaction between the ε-caprolactone and the EDA occurs which causes the temperature to rise gradually to 80 degrees Celsius (° C.). A white deposit forms and the reactor contents solidify, at which the stirring is stopped. The reactor contents are then cooled to 20° C. and are then allowed to rest for 15 hours. The reactor contents are then heated to 140° C. at which temperature the solidified reactor contents melt. The liquid product is then discharged from the reactor into a collecting tray. A nuclear magnetic resonance study of the resulting product shows that the molar concentration of C2C diamide diol in the product exceeds 80 percent. The melting temperature of the C2C diamide diol monomer product is 140° C.

Step (b): Contacting C2C with Dimethyl Adipate (DMA)

A 100 liter single shaft Kneader-Devolatizer reactor equipped with a distillation column and a vacuum pump system is nitrogen purged, and heated under nitrogen atmosphere to 80° C. (based on thermostat). Dimethyl adipate (DMA; 38.324 kg) and C2C diamide diol monomer (31.724 kg) are fed into the kneader. The slurry is stirred at 50 revolutions per minute (rpm).

Step (c): Contacting C2C/DMA with 1,4-butanediol, Distilling Methanol and Transesterification 1,4-Butanediol (18.436 kg) is added to the slurry of Step (b) at a temperature of about 60° C. The reactor temperature is further increased to 145° C. to obtain a homogeneous solution. Still under nitrogen atmosphere, a solution of titanium(IV) butoxide (153 g) in 1.380 kg 1,4-butanediol is injected at a temperature of 145° C. into the reactor, and methanol evolution starts. The temperature in the reactor is slowly increased to 180° C. over 1.75 hours, and is held for 45 additional minutes to complete distillation of methanol at ambient pressure. 12.664 kilograms of methanol are collected.

Step (d): Distilling 1,4-butanediol and Polycondensation to Give PEA-C2C50%

Reactor dome temperature is increased to 130° C. and the vacuum system activated stepwise to a reactor pressure of 7 mbar (0.7 kiloPascals (kPa)) in 1 hour. Temperature in the kneader/devolatizer reactor is kept at 180° C. Then the vacuum is increased to 0.7 mbar (0.07 kPa) for 7 hours while the temperature is increased to 190° C. The reactor is kept for 3 additional hours at 191° C. and with vacuum ranging from 0.87 to 0.75 mbar. At this point a sample of the reactor contents is taken (Sample 1); melt viscosities were 6575 megaPascals (MPas) at 180° C. and 5300 MPas at 190° C. The reaction is continued for another 1.5 hours until the final melt viscosities are recorded as 8400 MPas at 180° C. and 6575 MPas at 190° C. (Sample 2). Then the liquid Kneader/Devolatizer reactor contents are discharged at high temperature of about 190° C. into collecting trays, the polymer is cooled to room temperature and grinded. Final product is 57.95 kg (87.8% yield) of melt viscosities 8625 MPas at 180° C. and 6725 MPas at 190° C. (Sample 3). Samples 1 to 3 have the data shown below in Table 2.

TABLE 2

Melt viscosities and molecular weights of samples of MSA Copolyesteramide

| Hours in full vacuum* | Sample Number | Spindle No. 28** (rpm) | Viscosity at 180° C. (MPas) | Viscosity at 190° C. (MPas) | $M_n$ by 1H-NMR (g/mol) |
|---|---|---|---|---|---|
| 10 | 1 | 20 | 6575 | 5300 | 6450 |
| 11.5 | 2 | 20 | 8400 | 6575 | 6900 |
| 11.5 | 3 | 20 | 8625 | 6725 | 7200 |

*Vacuum < 1.2 mbar
**Viscometer used: Brookfield DV-II+ Viscometer™

Preparations 1A, 1B, and 1C

Preparation of MSA Material that is a Polyesteramide (PEA) Comprising 50 Mole Percent of ethylene-N,N'-dihydroxyhexanamide (C2C) Monomer (the MSA Material is Generally Designated as a PEA-C2C50%)

Step (a): Contacting C2C with Dimethyl Adipate.

A devolitizer reactor (for instance RTD 8 from Buss-SMS) is charged with 2.622 kg liquid dimethyl adipate and 2.163 kg of the solid C2C diamide diol monomer produced as described above. The reactor contents are brought slowly under nitrogen purge to a temperature of 140° C. in order to melt the C2C diamide diol monomer in the reaction mixture. Step (b) Contacting the Composition with 1,4-butanediol without Further Addition of Non-Volatile Diols, Acids or Branching Agents.

1.352 kg of 1,4-butanediol are added to the reactor contents of step (a) followed by 105 milliliters (mL) of a 10 percent by weight solution of tetrabutoxy titanium (IV) in 1,4-butanediol. The resulting reaction results in the formation of methanol which is then removed as vapor by the nitrogen purge from the reactor system. The pressure in the system is maintained at atmospheric pressure, and temperature is gradually raised to 180° C. The reaction and distillation of methanol is continued until the evolution of methanol subsides. The pressure in the reactor is then lowered to an absolute pressure of 450 millibars (mbar) and then stepwise to 20 mbar, resulting in further evolution of methanol vapor from the reaction mixture. When the flow of methanol subsides the pressure in the reactor is further lowered an absolute pressure of 0.25 mbar to initiate distillation of 1,4-butanediol, and the temperature in the reactor is gradually increased to 200° C. When 710 mL of 1,4-butanediol has been recovered from the reactor, the vacuum in the reactor is broken and the resulting molten amide ester polymer composition is discharged from the reactor. The resulting polymer, designated_PEA-C2C-50% (coded P2-8) has a $M_n$ (by $^1$H-NMR in $d_4$-acetic acid) of 7480 g/mol, i.e., about 7500 g/mol. Inherent viscosity=0.32 dL/g (methanol:chloroform (1:1 w:w), 30.0° C., 0.5 g/dL). By $^1$H-NMR it was determined that 51.2 mole % of polymer repeat units contain a residual of the C2C diamide diol monomer.

The above procedure is repeated three times, except number of hours in full vacuum (0.25 mbar) are increased and aliquots are periodically taken and subjected to carbon-13 NMR ($^{13}$C-NMR) or $^1$H-NMR to monitor $M_n$, to prepare three different batches, Preparations 1A, 1B, and 1C, respectively, of PEA-C2C50% compositions at 50 mole % C2C content calculated on the total amount of diols incorporated in the polymer structure (coded P1-6, P3-7, and P4, respectively) having the following properties recited in Table 3. In Table 3, values for Mn are determined using $^{13}$C-NMR in a manner analogous to the $^1$H-NMR procedure described previously.

COMPARATIVE EXAMPLES

Comparative Example (CE) 1A and 1B

CE1A: Composite of 40 wt % HDPE 12450N and 60 wt % of the 40-Mesh Maple Wood Fiber; and CE1B: Composite of 30 wt % HDPE 12450N and 70 wt % of the 40-Mesh Maple Wood Fiber Following Compounding Procedure 1, Haake blending of 40 wt % or 30 wt % HDPE 12450N and 60 wt % or 70 wt % of the 40-mesh maple wood fiber are separately carried out at 170° C. to 180° C. and 25 rpm to 30 rpm for 20 minutes to give the composites CE1A and CE1B, respectively. The procedures are repeated such that CE1A comprises Blend 1 and 2 and CE1B comprises Blend 1 and 2.

For each of Blends 1 and 2 of CE1A and CE1B, torque of blending is measured in Newton·meters (N·m) versus blending time in minutes (min), and the measurements are plotted as shown in FIG. 1. In FIG. 1, maximum torque of blending for the blends are in a range of from about 23 N·m to about 27 N·m.

Starting material HDPE 12450N and the blends of CE1A and CE1B are separately molded into tensile bars according to Compression Molding Procedure 1 described previously, and the resulting moldings characterized by flexural modulus according to ASTM D-790 and Ultimate Tensile according to ASTM D-638. The results are shown later in Table 5.

Comparative Examples 2A and 2B

CE2A: Composite of 40 wt % (AMPLIFY™ GR205 and HDPE 12450N) and 60 wt % of the 40-mesh maple wood fiber; and CE2B: Composite of 30 wt % Amplify GR205/HDPE 12450N Blend and 70 wt % of the 40-Mesh Maple Wood Fiber Following Compounding Procedure 1, Haake blending of 40 wt % or 30 wt % (Amplify GR205 and HDPE 12450N) and 60 wt % or 70 wt % of the 40-mesh maple wood fiber are separately carried out at 170° C. to 180° C. and 25 rpm to 30 rpm for 20 minutes to give the composites CE2A and CE2B, respectively. The procedures are repeated such that CE2A comprises Blend 1 and 2 and CE2B comprises Blend 1 and 2.

Figure 2:
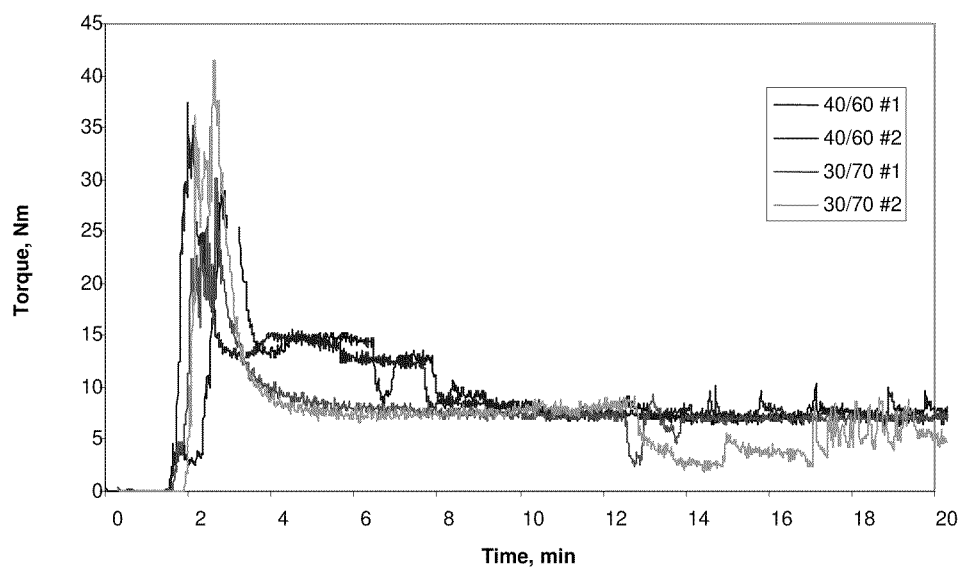
FIG. 2 is graphical plot of torque of blending for each of Blends 1 and 2 of Comparative Examples 2A and 2B.

For each of Blends 1 and 2 of CE2A and CE2B, torque of blending is measured in Newton·meters (N·m) versus blending time in minutes (min), and the measurements are plotted as shown in FIG. 2. In FIG. 2, maximum torque of blending for the blends are in a range of from about 28 N·m to about 42 N·m.

Starting blend of Amplify GR205 and HDPE 12450N and the blends of CE2A and CE2B are separately molded into tensile bars according to Compression Molding Procedure 1 described previously, and the resulting moldings character-

TABLE 3

| Preparation No. (product code) | $M_n$ (g/mol) based on 13C-NMR | Melting point (° C.) | Melt viscosity (Pa · s) at 160° C.* | Ultimate tensile strength (MPa) | Elongation to break (%) | Modulus (MPa) |
|---|---|---|---|---|---|---|
| 1A (P1-6) | 12,800 | NP* | NP | 14.4 | 586 | 367 |
| 1B (P3-7) | 19,800 | 132 | 21 | 21 | 735 | 279 |
| 1C (P4) | 10,800 | 124 | 18 | 17 | 840 | 290 |

*NP means not provided.

ized by flexural modulus according to ASTM D-790 and Ultimate Tensile according to ASTM D-638. The results are shown later in Table 5.

Comparative Example 3

Unfilled PEA-C2C50% of Sample 3

Figure 9:
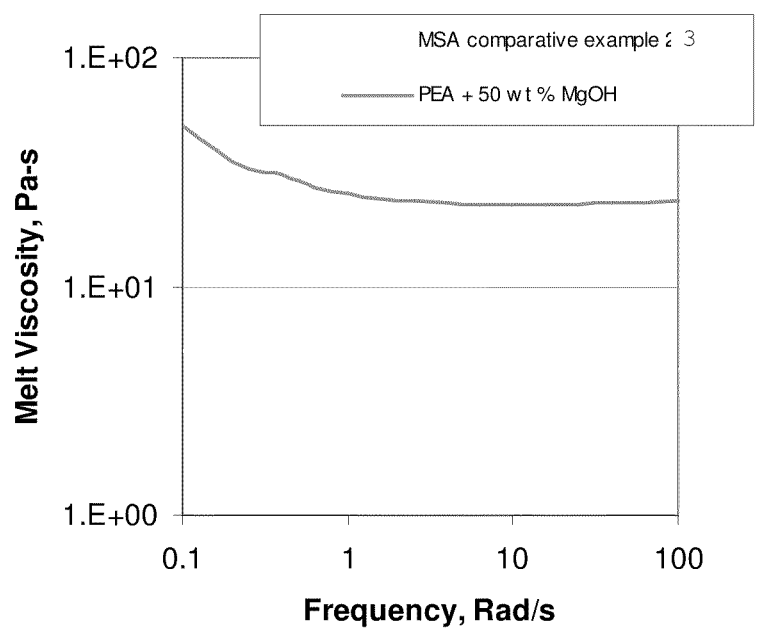
FIG. 9 graphically depicts melt viscosity results for the MSA material of Comparative Example 3 and the $Mg(OH)_2$ composite of Example 5.

Separate samples of the PEA-C2C50% of Sample 3 are compression molded following Compression Molding Procedure 1, prepared as plaques, or prepared as flat sheets, and subjected to melt viscosity measurements according to the procedure described previously. Melt viscosity results are shown as part of FIG. 9. In FIG. 9, the unfilled PEA-C2C50% of Sample 3 is referred to as "MSA of comparative example 3."

Examples of the Present Invention

Example 1A to 1D

Example 1A: Composite of 30 wt % PEA-C2C50% P4 of Preparation 1C and 70 wt % of the 40-Mesh Maple Wood Fiber; Example 1B: Composite of 40 wt % PEA-C2C50% P4 of Preparation 1C and 60 wt % of the 40-Mesh Maple Wood Fiber; Example 1C: Composite of 50 wt % PEA-C2C50% P4 of Preparation 1C and 50 wt % of the 40-Mesh Maple Wood Fiber; and Example 1D: Composite of 60 Wt % Pea-C2C50% P4 of Preparation 1C and 40 wt % of the 40-Mesh Maple Wood Fiber Following Compounding Procedure 1, Haake blending of 30 wt %, 40 wt %, 50 wt %, or 60 wt % PEA-C2C50% P4 of Preparation 1C and 70 wt %, 60 wt %, 50 wt %, or 40 wt % of the 40-mesh maple wood fiber are separately carried out at 170° C. and 65 rpm-75 rpm for 10 minutes to give Blend 1 of each of the composites of Examples 1A to 1D, respectively. The procedures of Examples 1A and 1B are repeated to also give Blend 2 of Example 1A and Blend 2 of Example 1B. For easy reference, the blends are summarized in Table 4 below.

TABLE 4

| Blend 1 of Examples 1A to 1D and Blend 2 of Examples 1A and 1B. | | |
|---|---|---|
| Composite | Amount of PEA-C2C50% P4 of Preparation 1C (wt %) | Amount of 40-mesh maple wood fiber (wt %) |
| Example 1A, Blends 1 and 2 | 30 | 70 |
| Example 1B, Blends 1 and 2 | 40 | 60 |
| Example 1C, Blend 1 | 50 | 50 |
| Example 1D, Blend 1 | 60 | 40 |

Figure 3:
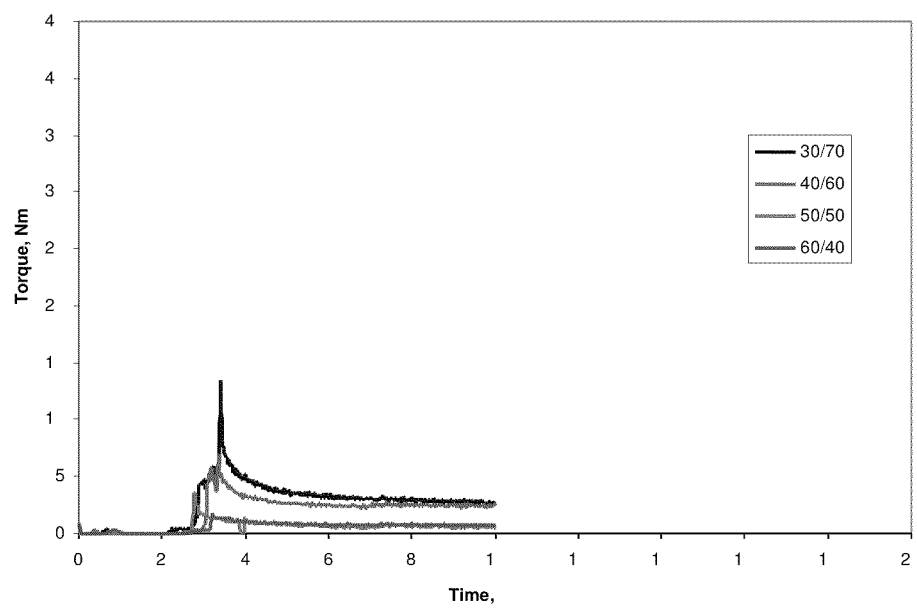
FIG. 3 is graphical plot of torque of blending for each of Examples 1A to 1D.

For each of the composites of Examples 1A to 1D, torque of blending is measured in Newton·meters (N·m) versus blending time in minutes (min), and the measurements are plotted as shown in FIG. 3. In FIG. 3, maximum torque of blending for the composites are in a range of from about 2 N·m to about 13 N·m.

Blends 1 and 2 of each of Examples 1A and 1B are separately molded into tensile bars according to Compression Molding Procedure 1 described previously, and the resulting moldings characterized by flexural modulus according to ASTM D-790 and Ultimate Tensile according to ASTM D-638. The results are shown later in Table 5.

Figure 4:
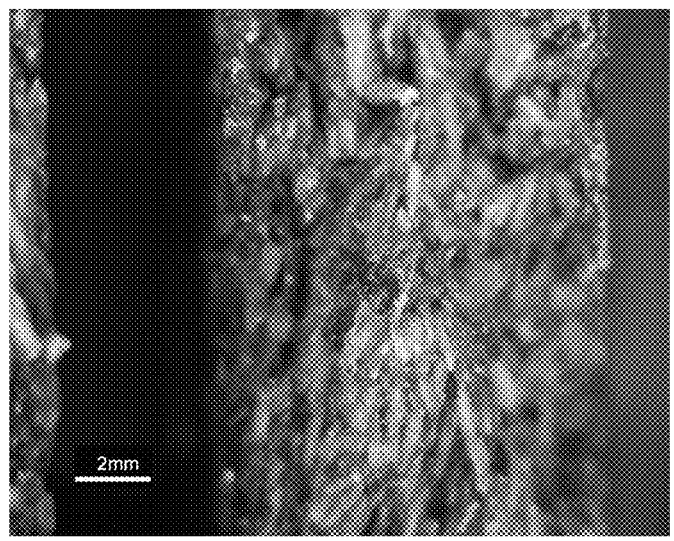
FIG. 4 shows an optical image of a portion of a fracture surface of a tensile bar comprising the composite of Example 1A.
Figure 5:
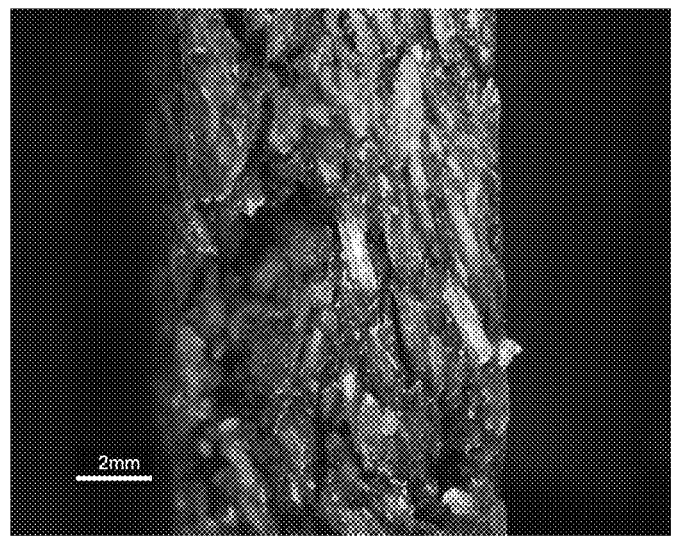
FIG. 5 shows an optical image of a portion of a fracture surface of a tensile bar comprising the composite of Example 1B.

An optical image of a portion of a fracture surface of the tensile bar comprising the composite of Example 1A is shown in FIG. 4. An optical image of a portion of a fracture surface of the tensile bar comprising the composite of Example 1B is shown in FIG. 5. In FIGS. 4 and 5, there appear to be no exposed wood fibers, i.e., the wood fibers appear to be essentially all wet out (covered) with the PEA-C2C50% P4 of Preparation 1C (i.e., the composites of Examples 1A and 1B lack zones of unattached wood fibers).

Figure 6:
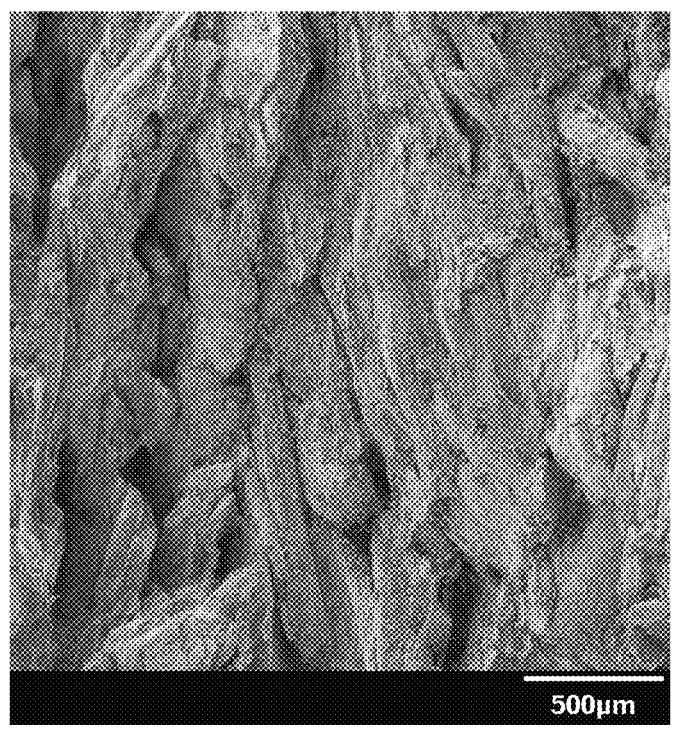
FIG. 6 shows a SEM image of a portion of the fracture surface of the tensile bar comprising the composite of Example 1A.

A SEM image of a portion of the fracture surface of the tensile bar comprising the composite of Example 1A is shown in FIG. 6. In FIG. 6, the wood fibers appear to be covered almost entirely with the PEA-C2C50% P4, i.e., the wood fibers appear to be almost entirely wet out.

Example 2A and 2B

Example 2A: Composite of 40 wt % PEA-C2C50% P3-7 of Preparation 1B and 60 wt % of the 40-Mesh Maple Wood Fiber; and Example 2B: Composite of 30 wt % PEA-C2C50% P3-7 of Preparation 1B and 70 wt % of the 40-Mesh Maple Wood Fiber Following Compounding Procedure 1, Haake blending of 40 wt % or 30 wt % PEA-C2C50% P3-7 of Preparation 1B and 60 wt % or 70 wt % of the 40-mesh maple wood fiber are separately carried out at 170° C. and 65 rpm-75 rpm for 10 minutes to give the composites of Blend 1 of Example 2A and Blend 1 of Example 2B, respectively. The procedure is repeated to also give Blend 2 of Example 2A and Blend 2 of Example 2B.

Figure 7:
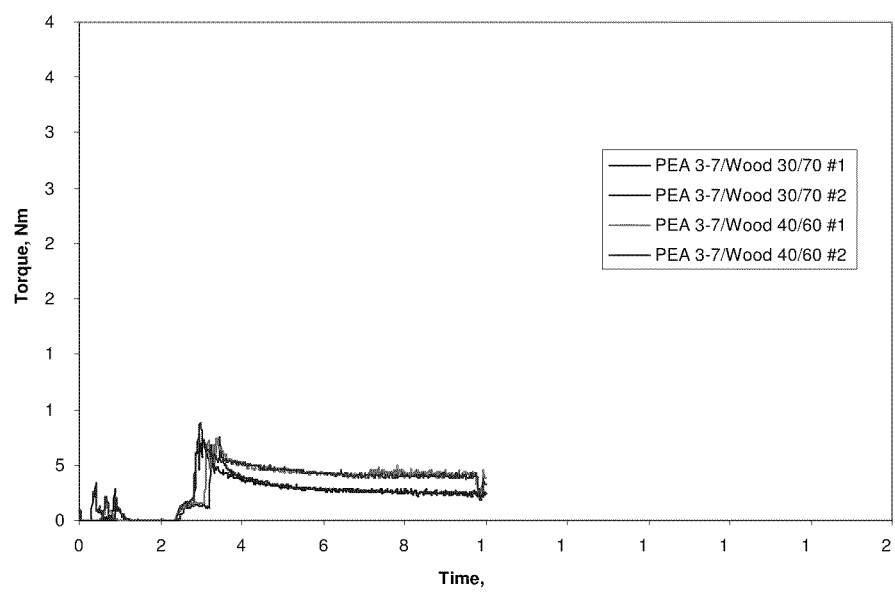
FIG. 7 is graphical plot of torque of blending for each of Blends 1 and 2 of Examples 2A and 2B.

For each of Blends 1 and 2 of each of Example 2A and Example 2B, torque of blending is measured in Newton·meters (N·m) versus blending time in minutes (min), and the measurements are plotted as shown in FIG. 7. In FIG. 7, maximum torque of blending for the blends are in a range of from about 7 N·m to about 9 N·m.

Blends 1 and 2 of each of Examples 2A and 2B are separately molded into tensile bars according to Compression Molding Procedure 1 described previously, and the resulting moldings characterized by flexural modulus according to ASTM D-790 and Ultimate Tensile according to ASTM D-638. The results are shown later in Table 5.

Example 3

Composite of 40 wt % PEA-C2C50% P1-6 of Preparation 1A and 60 wt % of the 40-Mesh Maple Wood Fiber Following Compounding Procedure 1, Haake blending of 40 wt % PEA-C2C50% P1-6 of Preparation 1A and 60 wt % of the 40-mesh maple wood fiber is separately carried out at 130° C. and 25 rpm for 10 minutes to give the composite of Example 3, Blend 1. The procedure is repeated two times to also give Example 3, Blends 2 and 3.

Figure 8:
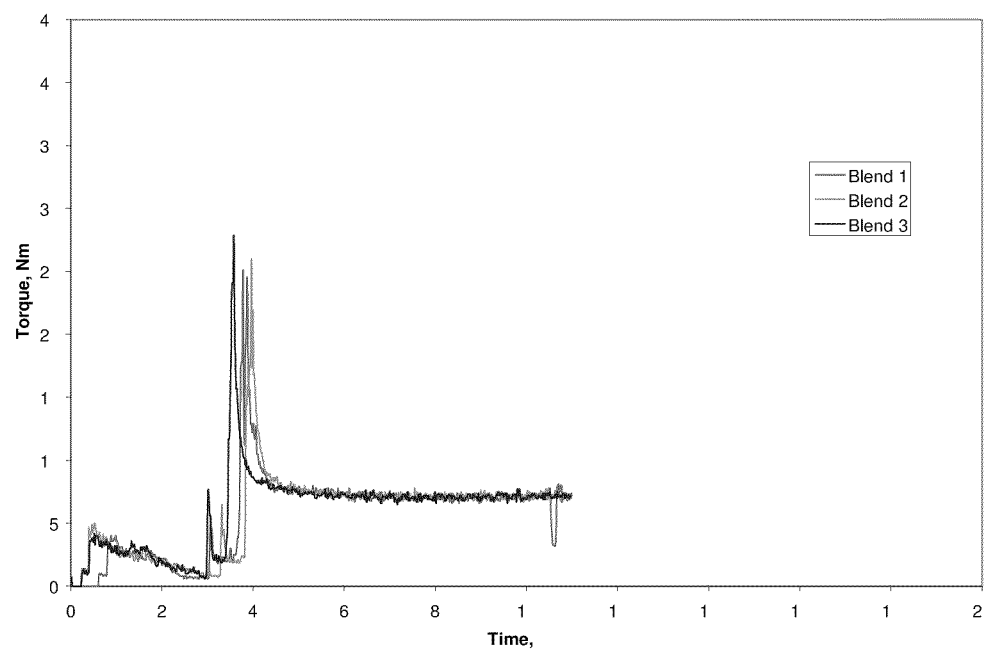
FIG. 8 is graphical plot of torque of blending for each of Blends 1 to 3 of Example 3.

For each of Blends 1 to 3 of Example 3, torque of blending is measured in Newton·meters (N·m) versus blending time in minutes (min), and the measurements are plotted as shown in FIG. 8. In FIG. 8, maximum torque of blending for the blends are in a range of from about 25 N·m to about 28 N·m.

Blends 1 to 3 of Example 3 are separately molded into tensile bars according to Compression Molding Procedure 2 described previously, and the resulting moldings characterized by flexural modulus according to ASTM D-790 and Ultimate Tensile according to ASTM D-638. The results are shown later in Table 5.

Example 4

Composite of 4 wt % HDPE 12450N, 36 wt % PEA-C2C50% P1-6 of Preparation 1A and 60 wt % of the 40-Mesh Maple Wood Fiber Following Compounding Procedure 1, Haake blending of 4 wt % HDPE 12450N, 36 wt % of PEA-C2C50% P1-6 of Preparation 1A and 60 wt % of the 40-mesh maple wood fiber is separately carried out at 130° C. and 25 rpm for 10 minutes to give the composite of Example 4, Blend 1. The procedure is repeated two times to also give Example 4, Blends 2 and 3.

The Blends 1 to 3 of Example 4 are separately molded into tensile bars according to Compression Molding Procedure 2 described previously, and the resulting moldings characterized by flexural modulus according to ASTM D-790 and Ultimate Tensile according to ASTM D-638. The results are shown below in Table 5.

TABLE 5 flexural modulus, tensile stress at break, and tensile strain at break of wood fiber (WF) composites

| Wood Fiber Composite | Flexural Modulus (ksi) | | Tensile Stress @Break (ksi) | | Tensile Strain @ Break (%) | |
|---|---|---|---|---|---|---|
| | 60 wt % WF(a) | 70 wt % WF | 60 wt % WF | 70 wt % WF | 60 wt % WF | 70 wt % WF |
| Comparative Example 1A | 327 | N.R.(b) | 1.08 | N.R. | 0.45 | N.R. |
| | | | 1.20 | | 0.56 | |
| Comparative Example 1B | N.R. | 316 | N.R. | 0.75 | N.R. | 0.50 |
| | | | | 0.65 | | 0.24 |
| Comparative Example 2A | 420 | N.R. | 4.09 | N.R. | 1.55 | N.R. |
| | 465 | | 4.59 | | 2.23 | |
| Comparative Example 2B | N.R. | 562 | N.R. | 4.58 | N.R. | 1.46 |
| | | 426 | | 4.57 | | 1.50 |
| Example 1A, Blend 1 | N.R. | 461 | N.R. | 1.44 | N.R. | 0.39 |
| Example 1A, Blend 2 | N.R. | 546 | N.R. | 1.69 | N.R. | 0.51 |
| Example 1B, Blend 1 | 425 | N.R. | 1.78 | N.R. | 0.49 | N.R. |
| Example 1B, Blend 2 | 420 | N.R. | 1.87 | N.R. | 0.36 | N.R. |
| Example 2A, Blend 1 | 302 | N.R. | 1.55 | N.R. | 1.27 | N.R. |
| Example 2A, Blend 2 | 316 | N.R. | 1.14 | N.R. | 0.33 | N.R. |
| Example 2B, Blend 1 | N.R. | 400 | N.R. | 1.87 | N.R. | 0.52 |
| Example 2B, Blend 2 | N.R. | 386 | N.R. | N.R. | N.R. | N.R. |
| Example 3, Blend 1 | 490 | N.R. | 2.79 | N.R. | 0.93 | N.R. |
| Example 3, Blend 2 | 510 | N.R. | 3.06 | N.R. | 0.82 | N.R. |
| Example 3, Blend 3 | 412 | N.R. | 3.08 | N.R. | 1.10 | N.R. |
| Example 4, Blend 1 | 472 | N.R. | 0.53 | N.R. | 0.55 | N.R. |
| Example 4, Blend 2 | 487 | N.R. | 0.76 | N.R. | 0.43 | N.R. |
| Example 4, Blend 3 | 628 | N.R. | 0.75 | N.R. | 0.22 | N.R. |

(a)WF means wood filler;
(b)N.R. means not relevant.

Example 5

Composite of Mg(OH)$_2$ and PEA-C2C50% of Sample 3

Figure 10:
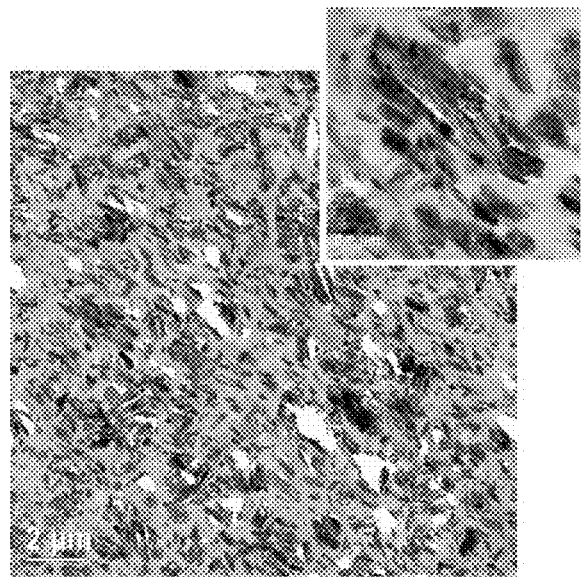
FIG. 10 is a transmission electron microscope (TEM) image at 1000 times magnification of the $Mg(OH)_2$ composite of Example 5.

Following Compounding Procedure 2, Haake blending of 50 wt % PEA-C2C50% of Sample 3 and 50 wt % of the Dead Sea S-10 grade Mg(OH)$_2$ is carried out as described previously to give a Mg(OH)$_2$ composite having 50 wt % of the Mg(OH)$_2$. Separate samples of the Mg(OH)$_2$ composite of Example 5 are compression molded according to Compression Molding Procedure 3 or prepared as plaques and subjected to melt viscosity measurements and TEM imaging according to the procedures described above. Results are respectively shown in FIGS. 9 and 10. In FIG. 9, the Mg(OH)$_2$ composite of Example 5 is referred as "PEA+50 wt % MgOH." FIG. 9 shows that the melt dynamic viscosity of the Mg(OH)$_2$ composite of Example 5 is within an acceptable range for processing by conventional melt processing techniques (i.e., materials maintain their processability when highly filled). FIG. 10 shows dispersion of Mg(OH)$_2$ in the Mg(OH)$_2$ composite of Example 5.

In FIG. 9, "1.E+05," for example, means 1 times 10 to the fifth power.

As discussed above, in some embodiments the polymer microfiller composite of the first embodiment has improved mechanical properties (e.g., storage modulus, flexural modulus, tensile stress at break, and tensile strain at break) while being melt processable at temperatures below 200° C. and torque of blending of less than 30 N·m.

While the invention has been described above according to its preferred embodiments of the present invention and examples of steps and elements thereof, it may be modified within the spirit and scope of this disclosure. This application is therefore intended to cover any variations, uses, or adaptations of the instant invention using the general principles disclosed herein. Further, this application is intended to cover such departures from the present disclosure as come within the known or customary practice in the art to which this invention pertains and which fall within the limits of the following claims.

What is claimed is:

1. A polymer microfiller composite comprising a molecularly self-assembling (MSA) material and a microfiller dispersed in the MSA material, wherein the microfiller is in the form of a particle having an average size of 1.0 micrometer (μm) or larger or a fiber having an average diameter of 1.0 micrometer or larger, and the microfiller comprises a cellulosic material, the microfiller comprising from 1 weight percent (wt %) to 90 wt % of the polymer microfiller composite based on total weight of the polymer microfiller composite; and wherein MSA material comprises a repeat unit of Formula I:

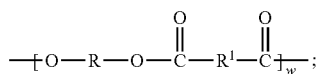

Formula I at least one second repeat unit selected from the group consisting of Formula II and Formula III:

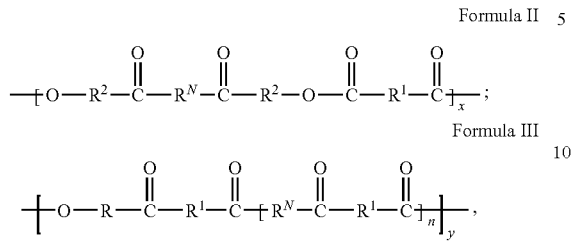

and an ester-urethane unit of Formula IV:

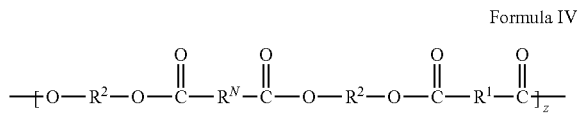

wherein:

R is at each occurrence, independently a $C_2$-$C_{20}$ non-aromatic hydrocarbylene group, a $C_2$-$C_{20}$ non-aromatic heterohydrocarbylene group, or a polyalkylene oxide group having a group molecular weight of from about 100 grams per mole to about 5000 grams per mole;

$R^1$ at each occurrence independently is a bond or a $C_1$-$C_{20}$ non-aromatic hydrocarbylene group;

$R^2$ at each occurrence independently is a $C_1$-$C_{20}$ non-aromatic hydrocarbylene group;

$R^N$ is —N($R^3$)—Ra—N($R^3$)—, where $R^3$ at each occurrence independently is H or a $C_1$-$C_6$ alkylene and Ra is a $C_2$-$C_{20}$ non-aromatic hydrocarbylene group, or $R^N$ is a $C_2$-$C_{20}$ heterocycloalkyl group containing the two nitrogen atoms, wherein each nitrogen atom is bonded to a carbonyl group according to formula (III) above;

n is at least 1 and has a mean value less than 2; and w represents the ester mol fraction of Formula I, and x, y and z represent the amide or urethane mole fractions of Formulas II, III, and IV, respectively, where w+x+y+z=1, and 0<w<1, and at least one of x and y is greater than zero but less than 1; wherein z is greater than zero and wherein when the MSA material is in a form of a melt, the polymer microfiller composite being characterized by a zero shear viscosity of less than 10,000,000 Pascal-seconds at from above $T_m$ up to about 40° C. above $T_m$ of the MSA material and wherein the MSA material has a number average molecular weight of less than 7,500 g/mol.

2. The polymer microfiller composite as in claim 1, wherein the cellulosic material comprises a wood.

3. The polymer microfiller composite as in claim 1, wherein the MSA material comprises self-assembling units comprising multiple hydrogen bonding arrays.

4. The polymer microfiller composite as in claim 1, wherein the number average molecular weight (Mn) of the molecularly self-assembling material is between about 1000 grams per mole and about 5,000 grams per mole.

5. The polymer microfiller composite as in claim 1, wherein the MSA material itself (i.e., without microfiller) is characterized by a melt viscosity of less than 100 pascal-seconds (Pa·sec.) at from above melting temperature ($T_m$) up to about 40 degrees Celsius (° C.) above $T_m$.

6. The polymer microfiller composite as in claim 1, wherein the MSA material itself is characterized by a melting temperature ($T_m$) greater than 60° C. or a glass transition temperature ($T_g$) greater than −80° C.

7. A process for making a polymer microfiller composite, the process comprising the step of: mixing a desired amount of a microfiller in either a melt comprising a MSA material or a solution comprising a solvent and the MSA material to produce the polymer microfiller composite of claim 1.

8. An article comprising the polymer microfiller composite as in claim 1.

9. The article as in claim 8, wherein the article comprises a molded part, construction material, paper, tape, label, or automotive component.

10. The article as in claim 8, wherein the article comprises a cosmetic, sound insulation, bather material, home furnishing, floor covering backing, coating substrate, laminating substrate, or electronic component.

* * * * *